May 9, 1967
M. E. KOCH
3,319,074
POWER SUPPLY CIRCUIT
Filed Dec. 23, 1963
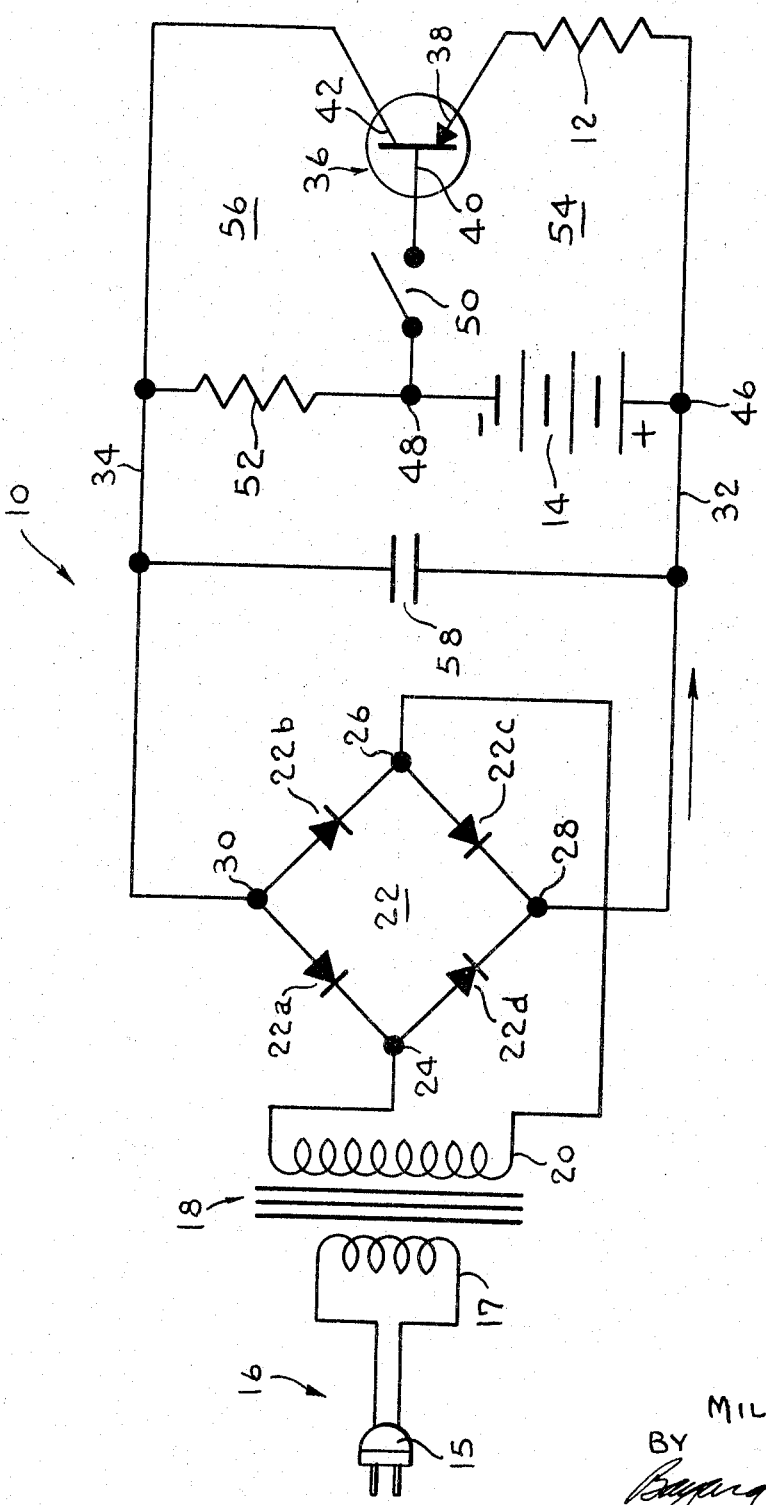
INVENTOR
MILTON E. KOCH
BY
*Bayard H. Michael*
ATTORNEY

United States Patent Office 3,319,074
Patented May 9, 1967

3,319,074
POWER SUPPLY CIRCUIT
Milton E. Koch, Milwaukee, Wis., assignor to La Belle Industries, Inc., Oconomowoc, Wis., a corporation of Wisconsin
Filed Dec. 23, 1963, Ser. No. 332,428
9 Claims. (Cl. 307—66)

This invention relates to power supplies and, more particularly, to an improved power supply which affords selective operation from an external or an internal source, such as suitable A.C. and D.C. sources, respectively.

Accordingly, a general object of this invention is the provision of an improved A.C.-D.C. power supply.

Another object of this invention is to provide a power supply which affords effective operation, both from an external and an internal source and damps out any momentary fluctuations which may occur when operating from the external source.

A still further, more specific, object of this invention is the provision of an A.C.-D.C. power supply which is selectively operable from an external A.C. source, an internal D.C. source, will damp out any momentary fluctuations which may occur on A.C. operation due to a temporary drop in power, and, furthermore, to connect the D.C. source so that it is recharged on A.C. operation.

The novel features of this invention are set forth in the appended claims. The invention itself, together with additional objects and advantages thereof, will be more clearly understood from a reading of the following description in connection with the accompanying drawing wherein a preferred embodiment of the invention is illustrated and in which the single figure is a schematic illustration of a power supply circuit arranged in accordance with this invention.

With particular reference to the drawing, power supply 10 is illustrated as connected to a load 12 and, since the power supply of this invention is not limited to use with any particular type of load, the load is illustrated schematically. For example, load 12 can be the motor, light source and other electrical apparatus included in a portable projector, such as the projector disclosed and claimed in the co-pending application of Messrs. Coulson, Antos and Schultze for a "Portable Projector," filed Jan. 13, 1964, Ser. No. 337,304 and assigned to the assignee of this application.

Power supply 10 is provided with an internal source of power 14 and means 16 for connecting the load for operation from an external source of power. In most instances and for the greater majority of the common applications of this invention internal source 14 will be a suitable D.C. source and the power supply will be effective to operate from an external A.C. source, although it could be constructed to operate from an external D.C. source as well. However, since the power supply will have its widest application as an A.C.-D.C. power supply, it will be discussed as such.

More particularly, the means for connecting the power supply for operation from an external A.C. source (not shown) can take the form of an electrical plug 15 of well-known construction and connected to the primary winding 17 of transformer 18. The secondary winding 20 of the transformer is connected to suitable rectifying means 22 which rectifies the A.C. input to the power supply to insure D.C. flow in the power supply circuit. Transformer 18 is preferably a step-down transformer which is operative to step down the A.C. voltage from the source, for example from 110 to 15 volts before it passes through rectifying means 22.

Any suitable rectifying means could be used in the circuit of the power supply. As illustrated, a bridge rectifier circuit is used with secondary winding 20 connected to the bridge rectifier at terminals 24 and 26 and individual rectifying elements 22a, 22b, 22c and 22d arranged in a manner well known in the art to achieve D.C. current flow through the power supply circuit in the direction of the arrow, i.e. from terminal 28, through the circuit and return to terminal 30.

Turning more specifically to the power supply circuit, one side of load 12 is connected to terminal 28 of the bridge rectifier through circuit 32 and the opposite side of the load is connected to terminal 30 of the rectifier through circuit 34 and transistor 36. As is well known in the art, transistor 36 includes emitter electrode 38, base electrode 40 and collector electrode 42. Transistor 36 is arranged to control current flow through load 12 and unless the transistor is in its "on" state, no current will flow through the load.

With reference to transistor 36 portions of the power supply circuit can be considered as a base-emitter circuit 54 and a base-collector circuit 56, the base-emitter circuit including load 12 and source 14 and the base-collector circuit including resistance 52. More particularly, internal source 14 is connected in base-emitter circuit 54 to furnish a source of power when the power supply is not connected to an external source. One side of D.C. source 14 is connected through junction 46 to load 12 and the opposite side of the D.C. source is connected through junction 48 to base 40 of the transistor. Switch 50 is also included in the base-emitter circuit to provide selective control in the completion of the base-emitter circuit. Resistance 52, of the base-collector circuit, is connected between junction 48 and circuit 34 to connect source 14 across the rectified D.C. voltage, load 12 and transistor 36 for a purpose which will become evident from the following description.

Switch 50, by controlling completion of the base-emitter circuit, provides control over current flow through load 12 in that transistor 36 will be "off" unless switch 50 is closed. Assuming the power supply to be disconnected from any external source so that it is intended to operate from internal source 14, closure of switch 50 completes the base-emitter circuit of transistor 36 so that current flows in the base-emitter circuit and through load 12. It should be noted that with the particular circuit arrangement illustrated, the predominant current flow is in the base-emitter circuit, however, some flow occurs from the emitter to collector but due to the relatively higher resistance in the base-collector circuit, due to resistance 52, this current flow is negligible and can for all practical purposes be disregarded and the circuit treated as though current flow is only in the base-emitter circuit.

For operation from an external source, plug 15 is connected to a suitable source of alternating current. Transistor 36 is initially "off" and no current flows in the power supply circuit until switch 50 is closed. Closure of switch 50 initiates current flow in the base-emitter circuit of the transistor to place the necessary bias on the base to establish current flow between emitter 38 and collector 42 and turn the transistor "on" rendering it fully conductive. That is, with a bias on the transistor base current flow occurs through the transistor and in this sense it is fully conductive. However, the transistor and the battery source are connected in a conventional emitter-follower circuit so that when operating from the external source the emitter voltage will correspond to the base voltage and determine the voltage drop across the load. Therefore, when operating from the external source, the transistor becomes a control element and maintains a constant voltage on the load, this voltage being the voltage on the transistor base which is in turn the voltage of the battery source. Accordingly, whether operating from the external or internal source the voltage on the load is essentially the same and in both instances is determined by the voltage of the battery and regardless of fluctuations in the value of the load the voltage drop thereacross remains constant on both external and internal operation. In addition to providing a selection between operation from either an internal or an external source, a further advantage of this circuit lies in its ability to power a wide range of loads, but with a constant voltage, and deliver currents to the load which are far in excess of the charging current of the battery. Thus, closure of switch 50 renders transistor 36 conductive, the output of transformer 18 is rectified by bridge circuit 22 and current flows through and energizes load 12. With the particular circuit arrangement of this invention, internal D.C. source 14 remains operative in the power supply circuit even when operating from an external source and will be effective to damp out any fluctuations which may result from a temporary drop in or loss of power in the external source. More particularly, when operating from an external source, internal source 14 is connected in the base-emitter circuit of the transistor and, should the rectified D.C. voltage experience a momentary dip, source 14 will furnish electrical power to compensate for any fluctuation and thereby maintain a relatively constant voltage on load 12.

Internal D.C. source 14 is preferably rechargeable and made up of a plurality of nickel cadmium batteries which, as is well recognized, are compact and readily rechargeable. Another particularly advantageous aspect of this invention is that, when operating from an external source, the internal D.C. source is connected across the D.C. voltage provided by the external source for recharging simultaneously with energization of load 12. More particularly, source 14 is connected across the rectified voltage from bridge circuit 22, on one side through junction 46 and on the other side through resistor 52. Resistor 52 limits, and provides, some measure of control over the charging current which flows in the internal source and is preferably provided in the base-collector circuit so as not to interfere with current flow in the base-emitter circuit when load 12 is energized from internal source 14. Selection of the characteristics of resistance 52, which can be linear or nonlinear, is based primarily on the desired charging characteristics of the battery. Moreover, when the load is energized from an external source resistance 52 is in parallel with the source and the load so as not to introduce a measurable or significant resistance in the load circuit which could affect the current drawn by a load. In both modes of load energization, either from an external or internal source, the resistance 52 does not appreciably affect, or at least to a measurable degree affect, the power available for energization of the load.

Capacitor 58 can be provided and connected across the rectified voltage to effect a further smoothening of the rectified D.C. applied to load 12 and thereby cooperates, in some degree, to the maintenance of a relatively constant voltage on load 12.

Although but one embodiment of the present invention has been illustrated and described, it will be apparent to those skilled in the art that various changes and modifications may be made therein without departing from the spirit of the invention or from the scope of the appended claims.

What I claim is:

1. An A.C.-D.C. power supply for energizing a load comprising, in combination,
   a load,
   means for connecting said load to and for energization from an A.C. source,
   means for rectifying current flow from said A.C. source,
   normally nonconducting circuit control means in series circuit relationship with and controlling current flow to said load from said A.C. source, said nonconducting circuit control means characterized by having a switch-over voltage at which the operational state thereof is changed from nonconducting to conducting to energize said load,
   a rechargeable D.C. source,
   circuit means connecting said D.C. source across said rectified D.C., said load and nonconducting circuit control means for receipt of charging current from said rectified D.C. independently of said load and said circuit control means,
   and circuit means including selectively operable switch means for connecting said D.C. source to said normally nonconducting circuit control means to apply said switch-over voltage thereto to render said nonconducting circuit control means conductive for energization of said load from said A.C. source and said D.C. source so that said load is connectable for operation from said D.C. source and from said A.C. source with said D.C. source remaining in circuit when said load is operated from said A.C. source to maintain a relatively constant voltage on said load should said A.C. source experience a temporary drop in power and said D.C. source is rechargeable independently of said load and circuit control means.

2. A power supply for energizing a load and comprising, in combination,
   a load,
   means for connecting said load to and for energization from an external electrical source,
   a transistor having an emitter, base and collector and connected in circuit with said load with said emitter and collector in series circuit relationship with said load to control current flow to said load,
   an internal D.C. source and circuit means connecting said D.C. source across said external source, said transistor and said load for receipt of charging current from said external source independently of said load and transistor,
   and circuit means including switch means for selectively connecting and disconnecting said D.C. source and said transistor base to render said transistor conductive and non-conductive for energization of said load from said external and D.C. source so that said load is selectively energized from said D.C. source, said external source, or both, and said D.C. source is charged upon connection to said external source both during operation of said load and when said load is de-energized.

3. An A.C.-D.C. power supply for energizing a load and comprising, in combination,
   a load,
   means for connecting said load to and for energization from an A.C. source,
   means for rectifying current flow from said A.C. source,
   a transistor having an emitter, base and collector and connected in circuit with said load and rectifying means to control flow of rectified current to said load,
   a rechargeable D.C. source connected in the emitter-base circuit of said transistor,
   switch means in said emitter-base circuit and operative selectively to connect and disconnect said D.C. source and the base of said transistor,
   said load connected in series circuit relationship with said emitter and collector and in said emitter-base circuit,
   and circuit means completing a normally closed circuit for said D.C. source across said rectified D.C. and across said load and said transistor for receipt of charging current from said rectified D.C. independently of said load and transistor so that said load is selectively energized by said D.C. source and said A.C. source with said D.C. source remaining in circuit with said load when said load is operated from said A.C. source to maintain a relatively constant voltage on said load should said A.C. source experience a temporary drop in power and said D.C. source is rechargeable independently of said load and transistor.

4. The combination of claim 3 wherein said circuit means includes a resistance element to limit charging current for said D.C. source, said resistance element being connected in the base collector circuit of said transistor and not interfering with energization of said load when said load is operated from said A.C. and D.C. sources.

5. The combination of claim 4 wherein said load comprises substantially the only voltage drop in the A.C. and D.C. current supply circuits for said load.

6. An A.C.-D.C. power supply for energizing a load comprising, in combination,
 a load,
 means for connecting said power supply to and for energization from an A.C. source,
 means for rectifying current flow from said A.C. source,
 one side of said load connected to one side of said rectifying means,
 circuit means for connecting said load to the other side of said rectifying means and including a transistor having an emitter, base and collector with the emitter connected to said load and the collector connected to the other side of said rectifying means,
 a D.C. source having one side connected to said one side of said load,
 circuit means including a selectively operable switch for connecting and disconnecting the other side of said D.C. source and the base of said transistor to render said transistor conductive and energize said load,
 and circuit means connecting said other side of said D.C. source to said other side of said rectifying means and to said collector so that said switch controls the conductive state of said transistor to control said load and so that said D.C. source is connected to receive charging current from said rectified A.C. source when said load is both energized and de-energized.

7. The A.C.-D.C. power supply of claim 12 wherein said last-mentioned circuit means includes current limiting means determining the charging current to said D.C. source when said load is connected for energization from said A.C. source but not interfering with or limiting the current delivered from said A.C. source to said load.

8. A power supply circuit comprising, in combination,
 a load,
 circuit means for connecting said load for energization from an external source,
 normally non-conducting circuit control means in circuit with and normally opening the circuit to said load,
 rechargeable D.C. source means,
 circuit means connecting said D.C. source means to said load to energize said load when said circuit control means closes the circuit to said load and also connecting said D.C. source across said load with respect to said external source for receipt of charging current from said external source independently of said load and said circuit control means,
 and charge limiting means in said last mentioned circuit means and determining the charging current to said D.C. source but not interfering with or limiting the current delivered from said external source to said load, said load being substantially the only voltage drop in the load energizing circuit.

9. The power supply of claim 1 wherein said circuit control means includes first and second electrodes and a control electrode connected to said switch means and responsive to said switch-over voltage to initiate current flow between said first and second electrodes.

References Cited by the Examiner
UNITED STATES PATENTS

| | | | |
|---|---|---|---|
| 3,049,623 | 8/1962 | Du Vall | 307—66 |
| 3,108,191 | 10/1963 | Bagno | 307—66 |
| 3,225,398 | 6/1966 | Bagno | 307—66 X |

ORIS L. RADER, *Primary Examiner.*

T. J. MADDEN, *Assistant Examiner.*

UNITED STATES PATENT OFFICE
CERTIFICATE OF CORRECTION

Patent No. 3,319,074                                  May 9, 1967

Milton E. Koch

It is hereby certified that error appears in the above numbered patent requiring correction and that the said Letters Patent should read as corrected below.

Column 5, line 38, for the claim reference numeral "12" read -- 6 --.

Signed and sealed this 14th day of November 1967.

(SEAL)
Attest:

Edward M. Fletcher, Jr.                                EDWARD J. BRENNER

Attesting Officer                                         Commissioner of Patents